United States Patent

[11] 3,568,103

[72] Inventor Thomas M. Fitzgerald
Framingham, Mass.

[21] Appl. No. 757,857
[22] Filed Sept. 6, 1968
[45] Patented Mar. 2, 1971
[73] Assignee the United States of America, as represented by the administrator of the National Aeronautics and Space Administration

[54] A SOLID STATE ACOUSTIC VARIABLE TIME DELAY LINE
5 Claims, 4 Drawing Figs.

[52] U.S. Cl. .................................................... 333/30, 333/72
[51] Int. Cl. .................................................... H03h 9/16, H03h 9/30
[50] Field of Search ........................................ 333/30, 72, 2800

[56] References Cited
UNITED STATES PATENTS

| | | | |
|---|---|---|---|
| 3,185,935 | 5/1965 | White | 333/30 |
| 3,254,231 | 5/1966 | Gandhi | 333/30X |
| 3,451,046 | 6/1969 | Cohler | 333/30X |

*Primary Examiner*—Eli Liberman
*Attorneys*—John R. Manning, Herbert E. Farmer and Garland T. McCoy

ABSTRACT: This disclosure describes a solid-state variable time delay line. A DC voltage applied to the longitudinal axis of piezoelectric material creates a high field domain that propagates along said axis from one end of the material to the other end. An RF pulse is applied to the end of the material toward which the high field domain is traveling. The RF pulse generates an acoustic wave that travels toward the high field domain. When the acoustic wave reaches the high field domain, it is reflected by the moving high field domain back toward the end of the material to which the RF pulse is applied. The total time delay is the time it takes for the acoustic wave to reach the high field domain and be reflected back to the RF input end of the material. Hence, by varying the time relationship between the creation of the moving high field domain by the DC voltage and the application of the RF pulse, a variable time delay is provided.

INVENTOR
Thomas M. Fitzgerald

BY

ATTORNEYS

A SOLID STATE ACOUSTIC VARIABLE TIME DELAY LINE

BACKGROUND OF THE INVENTION

Delay lines have found widespread use in various electronic circuits and systems, particularly in microwave electronic circuits and systems. Many solid state delay lines of a fixed nature have been developed for use in these circuits. However, because the time delay of these lines is fixed, they must be precisely formed under rigorous conditions if a precise time delay is desired. Therefore, they are expensive. In addition, because the time delay of these lines is fixed, they are not suitable for use in circuits that require a variable time delay line.

Some prior art solid-state variable time delay lines have been developed. One group of such prior art devices relies on a mechanical means for changing the delay of the delay line. More specifically, a sliding transducer is moved along the delay line so that the application of the received signal can be applied to different points on the delay line depending upon the amount of delay desired. More recently, variable time delays have been achieved using the magnetoelastic properties of certain materials such as YIG (Yttrium-Iron-Garnet).

While prior art variable time delay lines are suitable for use in some circuit and system applications, they have certain disadvantages making them unsuitable for use in other applications. For example, mechanical motion is not desirable in electronic systems where rapid changes in delay times are necessary. That is, a mechanical movement time delay line is inherently slow acting with respect to making changes in the length of delay to be provided and this slow change is undesirable. The major disadvantage of delay lines that use materials having magnetoelastic is that they require a magnetic field, and, in some environments, it is undesirable to generate a magnetic field. For example, it is undesirable to generate a magnetic field onboard a spacecraft when the spacecraft is designed to measure the earth's magnetic properties.

Therefore, it is an object of this invention to provide a variable time delay line that overcomes the disadvantages of prior art devices of a similar nature.

It is also an object of this invention to provide a variable time delay line that does not require mechanically moving components.

It is another object of this invention to provide a variable time delay line that does not require the use of a magnetic field to control a time delay.

It is also an object of this invention to provide a variable time delay line that is structurally uncomplicated and, therefore, inexpensive to manufacture.

It is another object of this invention to provide a solid state variable time delay line that requires a minimum of elements.

It is a still further object of this invention to provide a solid-state variable time delay line that has amplification properties as well as time delay properties.

SUMMARY OF THE INVENTION

In accordance with a principle of this invention, a solid-state variable time delay line is provided. A DC voltage is applied to the longitudinal axis of a piezoelectric material to create a high field domain that propagates from one end of the material to the other end. The high field domain is a region of high electric field (high electric potential). An RF pulse is applied to the end of the material toward which the high field domain is traveling. The RF pulse generates an acoustic wave in the material. The acoustic wave travels toward the high field domain and, when it reaches the high field domain, it is reflected by the moving high field domain. The reflected acoustic wave travels out the end of the material to which the RF pulse is applied. The total time delay is equal to the time it takes for the acoustic wave to travel to the high field domain and to return to its point of origin.

In accordance with a further principle of this invention, the time relationship between the application of the RF pulse and the application of the D.C. voltage is controlled by a control means so that the interaction between the high field domain and the acoustic wave can occur at different points along the longitudinal axis of the piezoelectric material. Hence, a controllable variable time delay line is provided by the invention.

In accordance with an alternative principle of the invention, the variable time delay is provided by varying the magnitude of the DC voltage applied to the piezoelectric material. The variation in magnitude controls the rate of travel of the high field domain so that the point of interaction between the acoustic wave and the high field domain is varied.

In accordance with a still further principle of this invention, electric field means are provided for amplifying the traveling acoustic wave after it enters the piezoelectric material prior to its being reflected by the high field domain. Hence, the inventive device can amplify as well as delay the acoustic wave. Alternatively, if the domain is moving at an appropriate velocity, the acoustic wave is amplified upon reflection because of an interaction between the acoustic wave and drifting electrons in the domain.

It will be appreciated from the foregoing description that the invention is an uncomplicated solid-state device that provides a variable time delay. The application DC an RF pulse to a piezoelectric material creates an acoustic wave that travels along the longitudinal axis of the material and the application of a DC voltage along said axis creates a high field domain that travels in the opposite direction to the direction of movement of the acoustic wave. When the high field domain meets the acoustic wave, the acoustic wave is reflected back toward its point of entry. A variable time delay is created by varying the time between the application of the RF pulse and the application of the DC voltage. Alternatively, the magnitude of the D.C. voltage can be varied to create a variable time delay. In addition, the invention provides a means for amplifying as well as delaying the acoustic wave.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
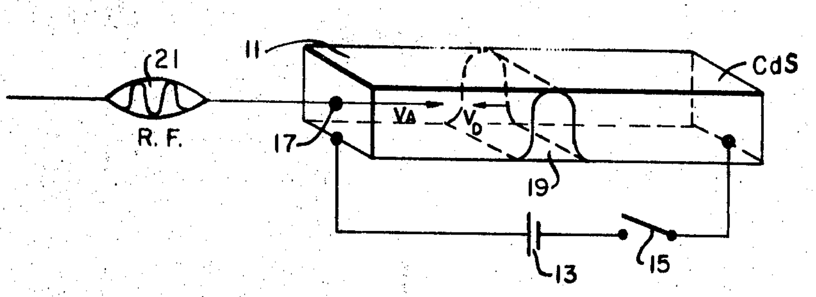
FIG. 1 is a schematic diagram illustrating one embodiment of the invention.

A schematic diagram of one embodiment of the invention is illustrated in FIG. 1 and comprises a body of piezoelectric material 11, a DC source 13 and a switch 15. the piezoelectric material may be formed of cadmium sulfide (CdS), for example. For purposes of illustration, the body of piezoelectric material 11 has a longitudinal axis and a rectangular cross section. However, any other generally regular form of piezoelectric material can be used, i.e., one having a round, triangular or trapezoidal cross section, for example. The DC source 13 is connected in series with the switch 15 across the ends of the body of piezoelectric material. This connection creates a DC field across the longitudinal axis of the material when the switch 15 is closed. When the switch 15 is closed, a high field domain 19 propagates from the negative end of the material to the positive end of the material, i.e., in the $V_D$ direction illustrated in FIG. 1.

A transducer 17 adapted to receive and RF pulse is mounted on the "positive" end of the body of piezoelectric material. When an RF pulse 21 is applied to the transducer 17 an acoustic wave is generated that propagates through the material toward the high field domain 19, i.e., in the $V_A$ direction. Upon reaching the high field domain, the acoustic wave is reflected because the elastic properties of the domain are different than the elastic properties of the bulk of material. The reflected signal propagates back through the material to the transducer and from the transducer out of the material. The total time delay is the time it takes for the acoustic wave to travel from the transducer to the domain and back to the transducer. In addition to delaying the acoustic wave, the wave is Doppler shifted in frequency (either positively or negatively) depending on the direction of travel of moving domain.

The total time delay is varied by varying the point of interaction between the high field domain and the acoustic wave. The point is varied by varying the time of creation of the high field domain relative to the time of application of the RF pulse. This time variation is created by controlling the time of closure of the switch 15. The variation in application time will, of course, vary in accordance with the material forming the body of piezoelectric material since the velocity of movement of an acoustic wave in a material is determined by the material and its orientation, i.e., the acoustic wave can be a fast or slow shear wave or a longitudinal wave depending on the material and its crystal orientation. In addition, the time of interaction is also dependent upon the velocity of the high field domain which is also dependent upon the material parameters.

It will be appreciated from the foregoing description that the invention is a rather uncomplicated solid-state device suitable for time delaying an RF pulse. By controlling the time of application of an RF pulse to a body of piezoelectric material and the time of application of an electric field across the longitudinal axis of the body, a variable time delay is provided. It should be noted in some devices that the transducer 17 can be eliminated because certain materials of a piezoelectric nature form their own transducers.

Figure 2:
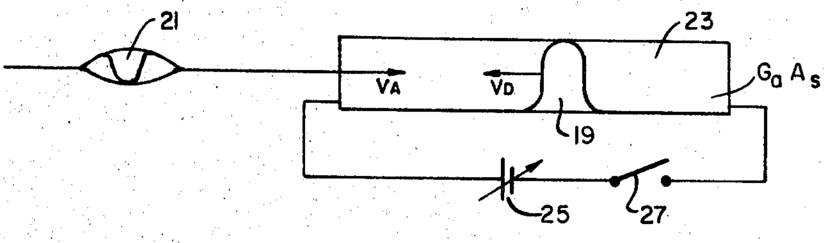
FIG. 2 is a schematic diagram illustrating a second embodiment of the invention.

FIG. 2 illustrates an alternative embodiment of the invention wherein the body of piezoelectric material 23 is formed of gallium arsenide, for example. A variable DC power source 25 is connected in series with a switch 27 across the piezoelectric material so as to create a high field domain when the switch is closed.

The primary difference between the embodiment illustrated in FIG. 2 and the embodiment illustrated in FIG. 1 is that the velocity of movement of the high field domain can be controlled in gallium arsenide or similar materials by controlling the magnitude of the DC voltage creating the high field domain whereas the magnitude of the voltage has no effect on velocity in materials such as cadmium sulfide. Hence, there are two methods of control provided in the FIG. 2 embodiment whereas there was only one method of control in the FIG. 1 embodiment. Specifically, the time relationship between the application of the RF pulse and the closure of the switch controls the time of generation of the high field domain relative to the time of application of the RF pulse. Hence, one control is provided. In addition, controlling the magnitude of the DC voltage source 25 controls the velocity of movement of the high field domain. Hence, a second control is provided.

Figure 3:
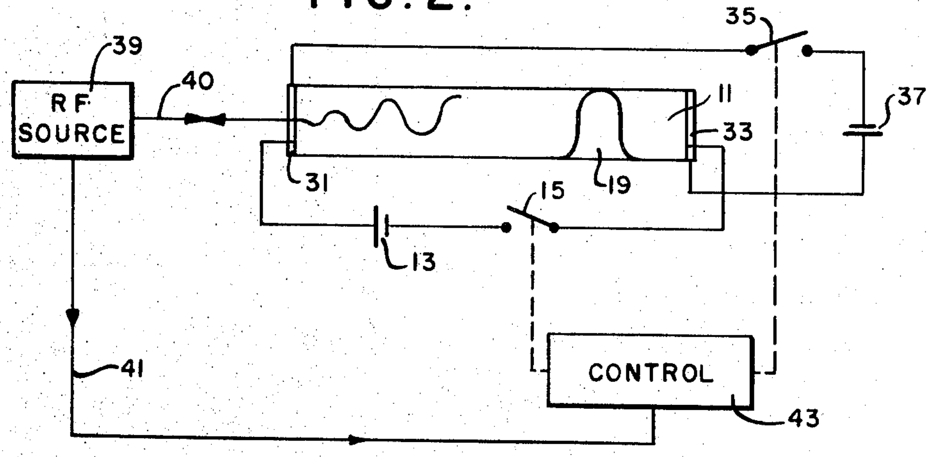
FIG. 3 is a schematic diagram illustrating a third embodiment of the invention.
Figure 4:
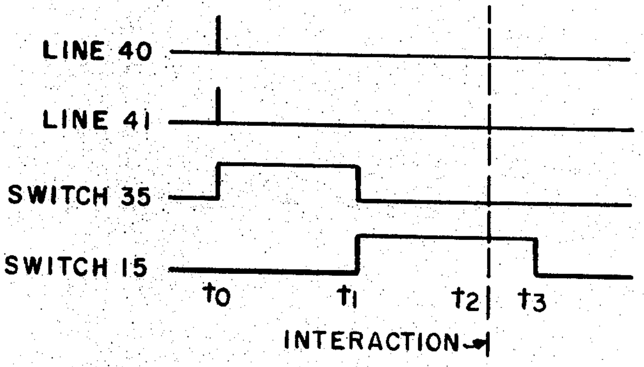
FIG. 4 is a timing diagram for FIG. 3.

FIG. 3 illustrates yet another embodiment of the invention wherein the acoustic wave is amplified as well as delayed. FIG. 3 also illustrates a control for controlling the time of application of various voltages to the body of piezoelectric material so that the body provides a desired time delay and a desired amount of amplification. FIG. 4 is a timing diagram for the embodiment of the invention illustrated in FIG. 3.

FIG. 3 comprises a basic circuit of the type illustrated in FIG. 1, i.e., a body of piezoelectric material 11, a DC voltage source 13 and a switch 15. Also illustrated in FIG. 3 are a pair of transducers 31 and 33 located at opposite ends of the piezoelectric material. The pair of transducers are connected together through a switch 35 connected in series with a second DC source 37 of opposite polarity to the first DC source 13. An RF source 39 is illustrated as connected by a line 40 through one of the end transducers 31 to one end of the piezoelectric material 11 so that an RF pulse can be applied to the material in the manner illustrated and described with respect to FIG. 1. A further line 41 connects the RF source 39 to a control 43 so that a control signal can be applied to the control 43. The control 43 controls the closure of switches 15 and 35 as illustrated by the dotted lines.

The device illustrated in FIG. 3 operates in the manner hereinafter described; at time $t_0$ (FIG. 4) the RF source generates an RF pulse that is applied through the transducer 31 to one end of the body of piezoelectric material 11. The RF pulse creates an acoustic wave inside of the body which travels from left to right as illustrated in FIG. 3. Simultaneously, or within a desired time relationship to the application of the RF pulse, a control pulse is applied along the line 41 to the control 43. The control 43 immediately closes the second switch 35 so that an amplifying field is created between the pair of transducers 31 and 33. This field amplifies the acoustic wave traveling along the longitudinal axis of the piezoelectric material in a manner well known in the prior art. After a predetermined period of time ($t1$), the control opens the second switch 35 and closes the first switch 15. The opening of the second switch prevents further amplification of the acoustic wave while the closing of the first switch creates a high field domain 19 that propagates toward the acoustic wave. When the acoustic wave and the high field domain meet ($t2$), the acoustic wave is reflected back to the transducer 31 in the manner heretofor described with respect to the operation of the embodiment of the invention illustrated in FIG. 1. The reflected wave passes through the transducer and passes along line 40 to the RF source 39 where it is detected and used by an electronic circuit or system (not shown) connected to the RF source.

It will be appreciated that the embodiment of the invention illustrated in FIG. 3 amplifies as well as time delays an RF pulse signal. It will also be appreciated that there are other amplification methods which can be used prior to the acoustic wave interacting with the high field domain. For example, as the acoustic wave travels down the piezoelectric material, an electric field can be applied to amplify the wave. At a critical field level, a high field domain will form and reflect the wave. The reflected wave will have an apparent gain. Alternatively, when the acoustic wave reaches the high field domain, the acoustic wave can penetrate the domain to a certain extent and then be reflected. During the penetration period, the acoustic wave will see some carriers with a drift velocity approximately equal to or greater than acoustic velocity. These carriers will couple energy to the reflected acoustic wave to cause an apparent gain. This latter method of amplification depends, to some extent, upon the shape of the domain and the velocity distribution of the carriers within the domain. Moreover, the body of material 11 can be formed of gallium arsenide or the like and the first DC source 13 can be variable.

It will be appreciated from the foregoing description that the invention provides an uncomplicated and, therefore, inexpensive solid-state means of providing a variable time delay line. The basic inventive device is a block of semiconductor material of a piezoelectric nature connected to a DC voltage source by a switch means. The DC voltage source and the switch means are connected in series across the longitudinal axis of the material so as to create a high field domain that propagates down the material when the switch is closed. The DC voltage source may be variable depending upon the material to be used, i.e., gallium arsenide, for example, as opposed to cadmium sulfide. If the voltage source is variable the velocity of the high field domain is controllable. The switch means may be a solid-state switch such as a transistor or the like, a conventional switch, or a relay switch depending upon the use of the invention. In addition to creating a time delay, the invention also provides a rather uncomplicated device for both amplifying and delaying a signal.

I claim:

1. A variable time delay line comprising:

a body of piezoelectric material having a longitudinal axis;

a pair of transducers, one transducer connected to one end of said body of piezoelectric material and the second transducer connected to the other end of said body of said piezoelectric material;

first means for applying a DC voltage to said longitudinal axis to create a high field domain that propagates along said longitudinal axis;

a second DC voltage source connected in series with a switch between said pair of transducers, said second source connected in opposite polarity to said first means; and second means comprising an RF pulse source electrically connected to one end of said body of piezoelectric material for applying a pulse to the end of said body of said piezoelectric material toward which said high field domain is traveling so that an acoustic wave is created in said body of said piezoelectric material and is reflected when said high field domain and said acoustic wave meet.

2. A variable time delay line as claimed in claim 1 wherein said first means includes a fixed DC source connected in series with a switch across the ends of said body of piezoelectric material.

3. A variable time delay line as claimed in claim 2 including a control electrically connected to said RF source and adapted to close said first and second switches in a predetermined manner.

4. A variable time delay line as claimed in claim 3 wherein said body of piezoelectric material is formed of cadmium sulfide.

5. A variable time delay line as claimed in claim 3 wherein said body of said piezoelectric material is formed of gallium arsenide.